US010606669B2

(12) United States Patent
Jacobs et al.

(10) Patent No.: US 10,606,669 B2
(45) Date of Patent: Mar. 31, 2020

(54) DOMAIN AND EVENT TYPE-SPECIFIC CONSENSUS PROCESS FOR A DISTRIBUTED LEDGER

(71) Applicant: Optum, Inc., Minnetonka, MN (US)

(72) Inventors: Michael Jacobs, Jordan, MN (US); Rajeev Cyrus, Minneapolis, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 16/003,214

(22) Filed: Jun. 8, 2018

(65) Prior Publication Data

US 2019/0377617 A1 Dec. 12, 2019

(51) Int. Cl.
*G06F 9/54* (2006.01)
*H04L 9/06* (2006.01)
*G06F 13/40* (2006.01)
*H04L 29/08* (2006.01)

(52) U.S. Cl.
CPC .......... *G06F 9/542* (2013.01); *G06F 13/4068* (2013.01); *H04L 9/0637* (2013.01); *H04L 67/10* (2013.01)

(58) Field of Classification Search
CPC ....................................................... G06F 9/542
USPC ........................................................ 719/318
See application file for complete search history.

(56) References Cited

U.S. PATENT DOCUMENTS 10,158,479 B2 * 12/2018 Chapman .............. H04L 9/0637
2016/0224949 A1 8/2016 Thomas et al.

2017/0075941 A1 3/2017 Finlow-Bates
2017/0236120 A1 8/2017 Herlihy et al.
2017/0243177 A1 8/2017 Johnsrud et al.
2017/0244757 A1 8/2017 Castinado et al.
2018/0276666 A1* 9/2018 Haldenby ............... H04L 63/10
(Continued)

FOREIGN PATENT DOCUMENTS

WO 2016/025080 A1 2/2016

OTHER PUBLICATIONS

Peterson, Kevin, et al., A Blockchain-Based Approach to Health Information Exchange Networks, White Paper Submitted in US Department of Health and Human Services Challenge, Jul. 1, 2016, Mayo Clinic, 10 pages.

(Continued)

*Primary Examiner* — Andy Ho
(74) *Attorney, Agent, or Firm* — Alston & Bird LLP

(57) ABSTRACT

Domain and/or event type-specific consensus processes for distributed ledger are provided. A consensus request is received by a core consensus engine. The consensus request corresponds to an event, the event (i) corresponds to a domain and (ii) has a type, and the consensus request comprises information corresponding to the event. Information corresponding to the event and the type are provided to the processing manager corresponding to the domain. The processing manager identifies a set of processing objects based on the type. The processing manager calls at least one processing object of the set via a corresponding interface and provides information corresponding to the event to the called processing object. The processing object is executed to generate a corresponding object result. The processing manager generates an aggregate result based on the object results. The core consensus engine determines a consensus response based at least in part on the aggregate result.

20 Claims, 8 Drawing Sheets

(56) References Cited

U.S. PATENT DOCUMENTS

| | | |
|---|---|---|
| 2019/0026146 A1 | 1/2019 | Peffers et al. |
| 2019/0058581 A1 | 2/2019 | Wood et al. |
| 2019/0089525 A1 | 3/2019 | Roets |
| 2019/0108140 A1* | 4/2019 | Deshpande ......... G06F 12/1408 |
| 2019/0236559 A1* | 8/2019 | Padmanabhan ........ G06Q 20/06 |

OTHER PUBLICATIONS

Hidde Lycklama A Nijeholt, et al., DecReg: A Framework for Preventing Double-Financing using Blockchain Technology, Apr. 1, 2017, BCC'17 Proceedings of the ACM Workshop on Blockchain, Cryptocurrencies and Contract, 7 pages.

* cited by examiner

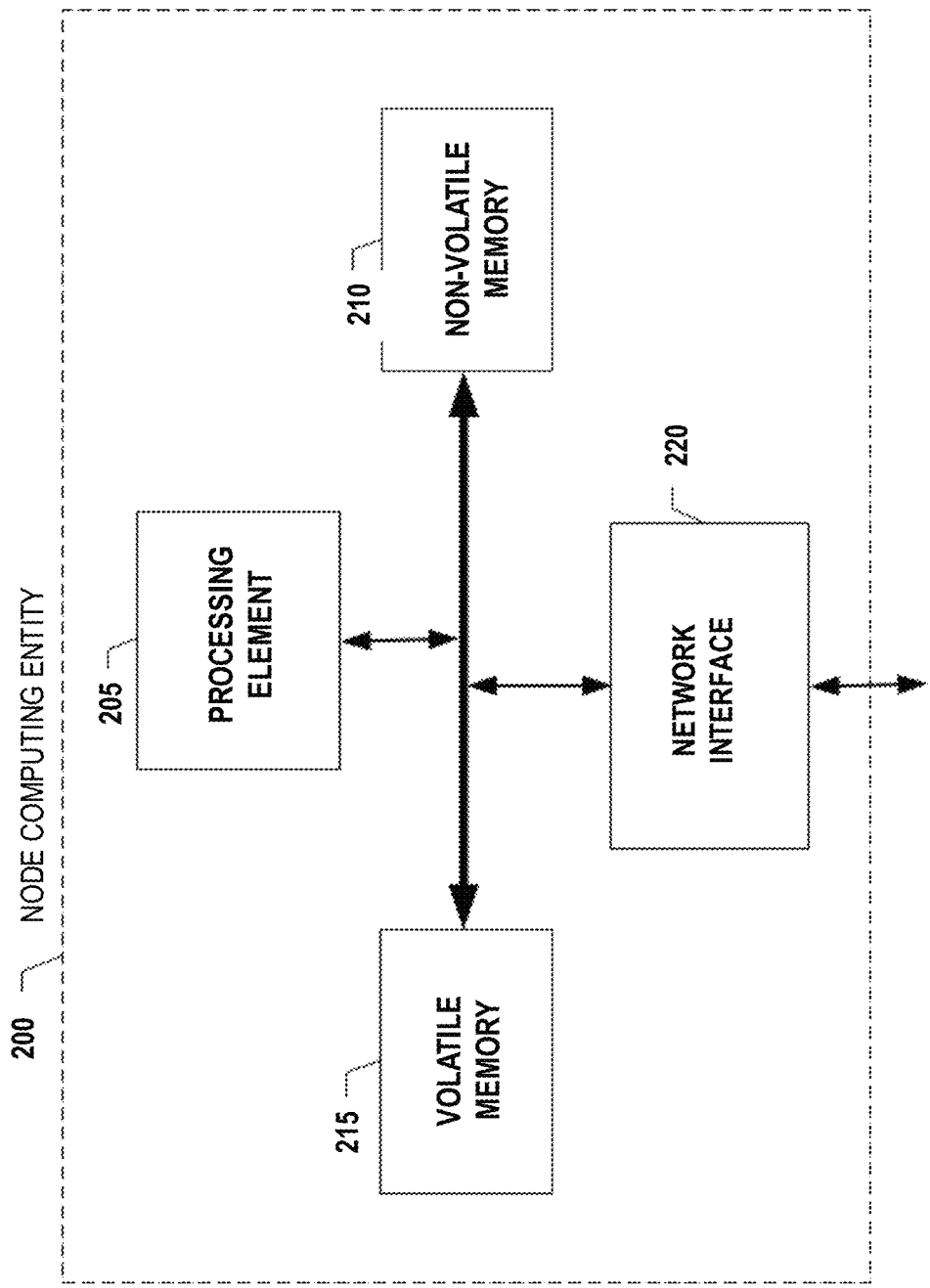

DOMAIN AND EVENT TYPE-SPECIFIC CONSENSUS PROCESS FOR A DISTRIBUTED LEDGER

FIELD

Various embodiments relate generally to distributed ledgers and processes and/or protocols for updating distributed ledgers. For example, an example embodiment provides a domain and action-type specific consensus process for a distributed ledger.

BACKGROUND

Distributed ledgers are data stores that are stored by a plurality of nodes that may be geographically remote with respect to one another. When a new event (e.g., instance of information/data, record/action/transaction, and/or the like) is posted to the distributed ledger, a consensus process is used to assure the quality and validity of the information/data stored in the distributed ledger. Often the consensus process depends on smart contracts for validating various types of events. A situation where distributed ledgers are particularly useful is when multiple relatively unrelated organizations want to confidently share and audit information and automate mutually beneficial processes. This typically entails the cooperation of competitors in a collective agreement that may be referred to as an alliance or consortium. As a result, there is the possibility that inconsistent versions of smart contracts may exist on the network that may corrupt the original intent of the information shared on the distributed ledger.

BRIEF SUMMARY OF SOME EXAMPLE EMBODIMENTS

Various embodiments provide methods, apparatuses, computer program products, systems, and/or the like that provide consistent consensus processing of events (e.g., instances of information/data, records, actions, transactions, blocks and/or the like) for a distributed ledger. In various embodiments, a distributed ledger is a data stored by a plurality of nodes. In an example embodiment, the consensus process for the distributed ledger is domain and/or type-specific. In various embodiments, the term domain refers to a particular sphere or area of knowledge, business, industry, and/or the like. Some non-limiting examples of domains are healthcare, finance, retail, digital rights, voting, supply chain management, and/or the like. In various embodiments, the term type refers to the further specialization of the domain to a specific class of transactions, data, event and/or the like. For example, if the domain is healthcare, some non-limiting examples of types of events or transactions are verifying the regulatory compliance of a submitted claim, confirming the address of a provider, verifying the patient has consented to share their information, etc.

In an example embodiment, the domain and type-specific consensus process is implemented using a chain of responsibility pattern. For example, a core consensus engine operating on a node computing entity may receive a consensus request from a requesting node of the distributed ledger and perform one or more core functions that are not domain or type-specific (e.g., checking a hash of an event, ensuring that the requesting node or user computing entity is permitted to submit events to the distributed ledger, and/or the like). In various embodiments, the node computing entity is a validating, notarizing, and/or endorsing node of the distributed ledger. The core consensus engine may interface with a domain specific engine comprising a processing manager that may identify a type-specific set of one or more processing objects, and cause the processing objects of the type-specific set of processing objects to generate object results. In an example embodiment, the determination of the type may be the responsibility of a processing object so that the processing manager may invoke all known processing objects without regard for whether or not the request applies to the processing object. The processing object result provided by a processing object to which the request does not apply would be a neutral response so as not to effect the aggregate consensus result. In an example embodiment, the object results would implement an application programming interface (API) contract specified by the processing manager. The processing manager may then aggregate the object results to generate an aggregate result that may be provided to the core consensus engine. The core consensus engine may then determine a consensus response and provide the consensus response to the requesting node. Through the use of the domain-specific processing managers configured to call the type-specific set of processing objects, the validity and acceptance checks of the consensus process may be performed in a consistent manner across all nodes, thereby eliminating the possibility of inconsistent smart contract enforcement of quality and acceptance norms.

According to an aspect of the present invention, a method for performing a domain and/or event type-specific consensus process of a distributed ledger is provided. In an example embodiment, the method comprises receiving a consensus request by a core consensus engine executed by a processor of a node computing entity. The node computing entity comprises the processor, a memory storing computer program code, and a communications interface. The node computing entity is one of a plurality of nodes of a distributed ledger network. For example, the node computing entity may store the distributed ledger. In an example embodiment, the node computing entity is a validating, notarizing, and/or endorsing node of the distributed ledger. The computer program code comprises executable portions corresponding to the core consensus engine. The consensus request corresponds to an event. The event (i) corresponds to a domain and (ii) has a type. The consensus request comprises information corresponding to the event. The method further comprises providing at least a portion of the information corresponding to the event and the type to the at least one processing manager executed by the processor of the node computing entity. The at least one processing manager corresponds to the domain. The method further comprises identifying a set of one or more processing objects by the processing manager based on the type; calling at least one processing object of the set by the processing manager via a corresponding interface and providing at least a portion of the information corresponding to the event to the at least one processing object; executing the at least one processing object by the processor of the node computing entity to generate a corresponding at least one object result; aggregating the at least one object result by the processing manager to generate an aggregate result; determining, by the core consensus engine, a consensus response based at least in part on the aggregate result; and causing the communications interface of the node computing entity to provide the consensus response, via execution of an executable portion corresponding to the core consensus engine by the processor.

According to another aspect of the present invention, an apparatus is provided. In an example embodiment, the apparatus comprises at least one processor, at least one communications interface, and at least one memory including computer program code. The computer program code comprises executable portions corresponding to a core consensus engine. The apparatus is a node of a plurality of nodes of a distributed ledger. The at least one memory and computer program code are configured to, with the processor, cause the apparatus to at least receive a consensus request by the core consensus engine executed by the processor. The consensus request corresponds to an event. The event (i) corresponds to a domain and (ii) has a type. The consensus request comprises information corresponding to the event. The at least one memory and computer program code are further configured to, with the processor, cause the apparatus to at least provide at least a portion of the information corresponding to the event and the type to the at least one processing manager executed by the processor, the at least one processing manager corresponding to the domain; identify a set of one or more processing objects by the processing manager based on the type; call at least one processing object of the set by the processing manager via a corresponding interface and provide at least a portion of the information corresponding to the event to the at least one processing object; execute the at least one processing object by the processor to generate a corresponding at least one object result; aggregate the at least one object result by the processing manager to generate an aggregate result; determine, by the core consensus engine, a consensus response based at least in part on the aggregate result; and cause the communications interface to provide the consensus response, via execution of an executable portion corresponding to the core consensus engine by the processor.

According to yet another aspect of the present invention, a computer program product is provided. In an example embodiment, the computer program product comprises at least one non-transitory computer-readable storage medium having computer-executable program code portions stored therein. The computer-executable program code portions comprise program code instructions corresponding (a) a core consensus engine and (b) a domain specific engine. The program code instructions corresponding to the domain specific engine comprise (i) program code instructions corresponding to a processing manager and (ii) one or more pluggable modules corresponding to one or more processing objects. The computer program code instructions, when executed by a processor of a node computing entity of a node of a distributed ledger, are configured to receive a consensus request by the core consensus engine. The consensus request corresponds to an event. The event (i) corresponds to a domain and (ii) has a type. The consensus request comprises information corresponding to the event. The computer program code instructions, when executed by the processor are further configured to provide at least a portion of the information corresponding to the event and the type to the at least one processing manager, the at least one processing manager corresponding to the domain; identify a set of one or more processing objects by the processing manager based on the type; call at least one processing object of the set by the processing manager via a corresponding interface and provide at least a portion of the information corresponding to the event to the at least one processing object; execute the at least one processing object to generate a corresponding at least one object result; aggregate the at least one object result by the processing manager to generate an aggregate result; determine, by the core consensus engine, a consensus response based at least in part on the aggregate result; and cause, by the core consensus engine, a communications interface of the node computing entity to provide the consensus response.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is a schematic of a node computing entity in accordance with certain embodiments of the present invention;

Figure 4:
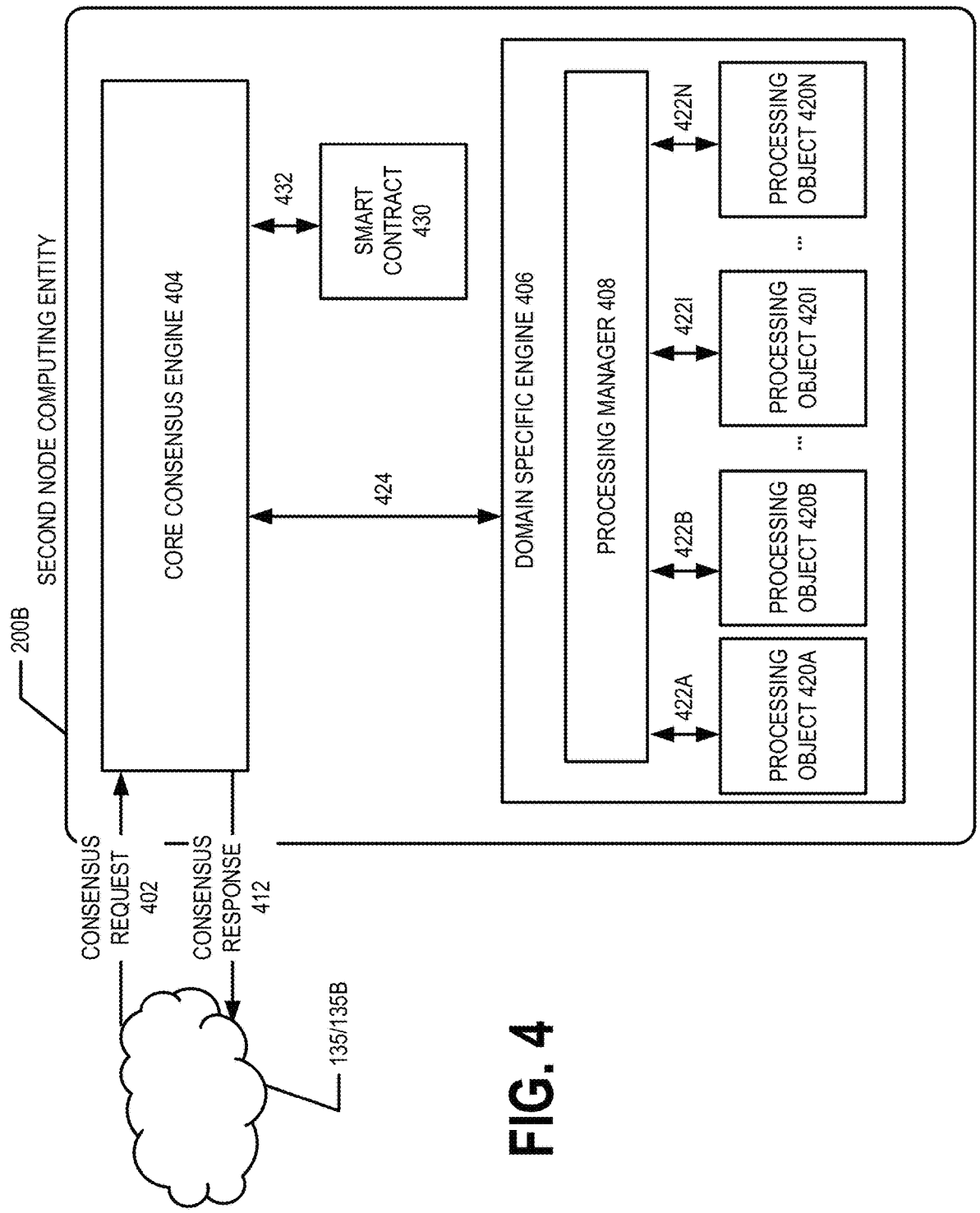
Figure 4A:
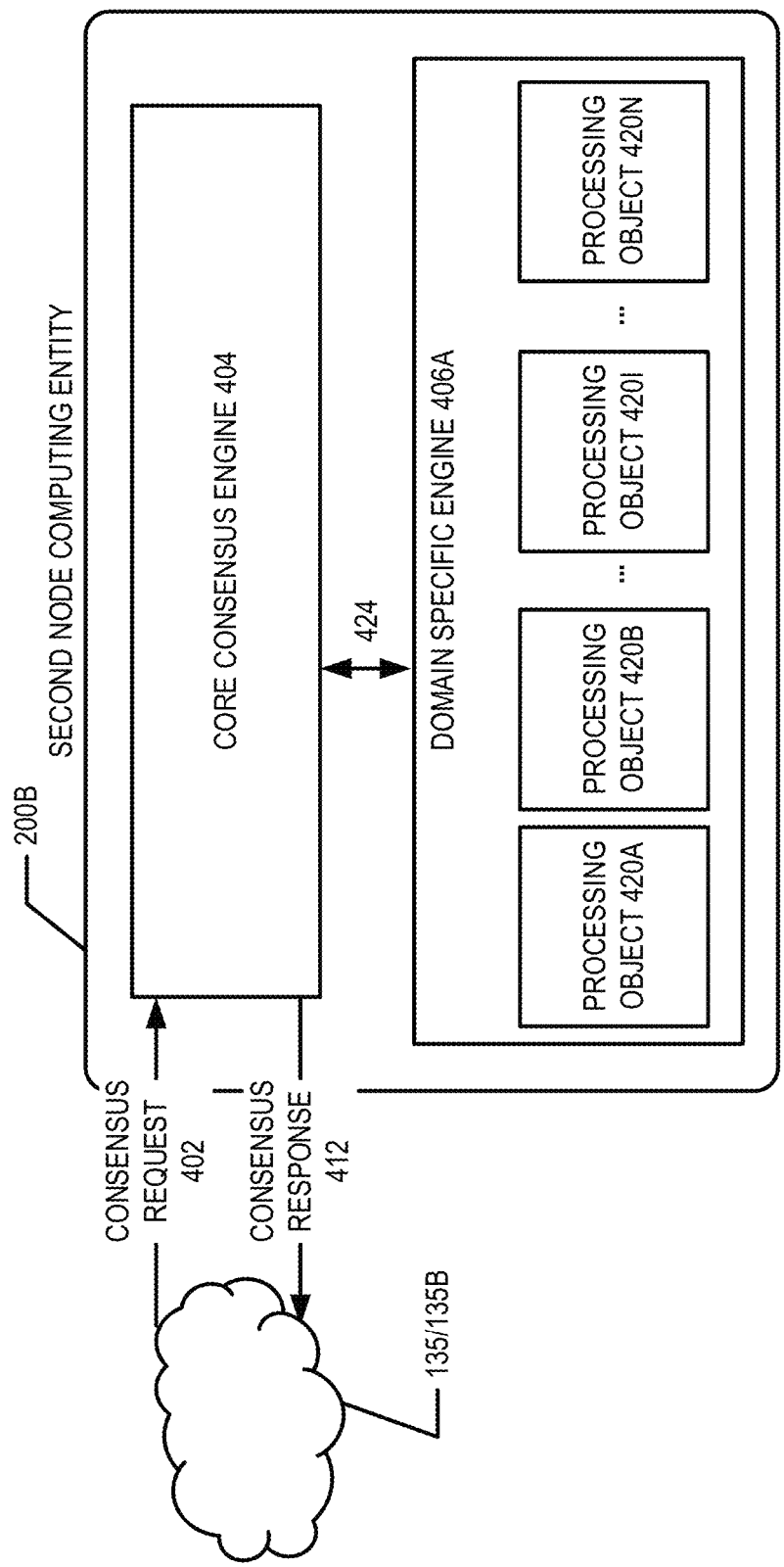
Figure 4B:
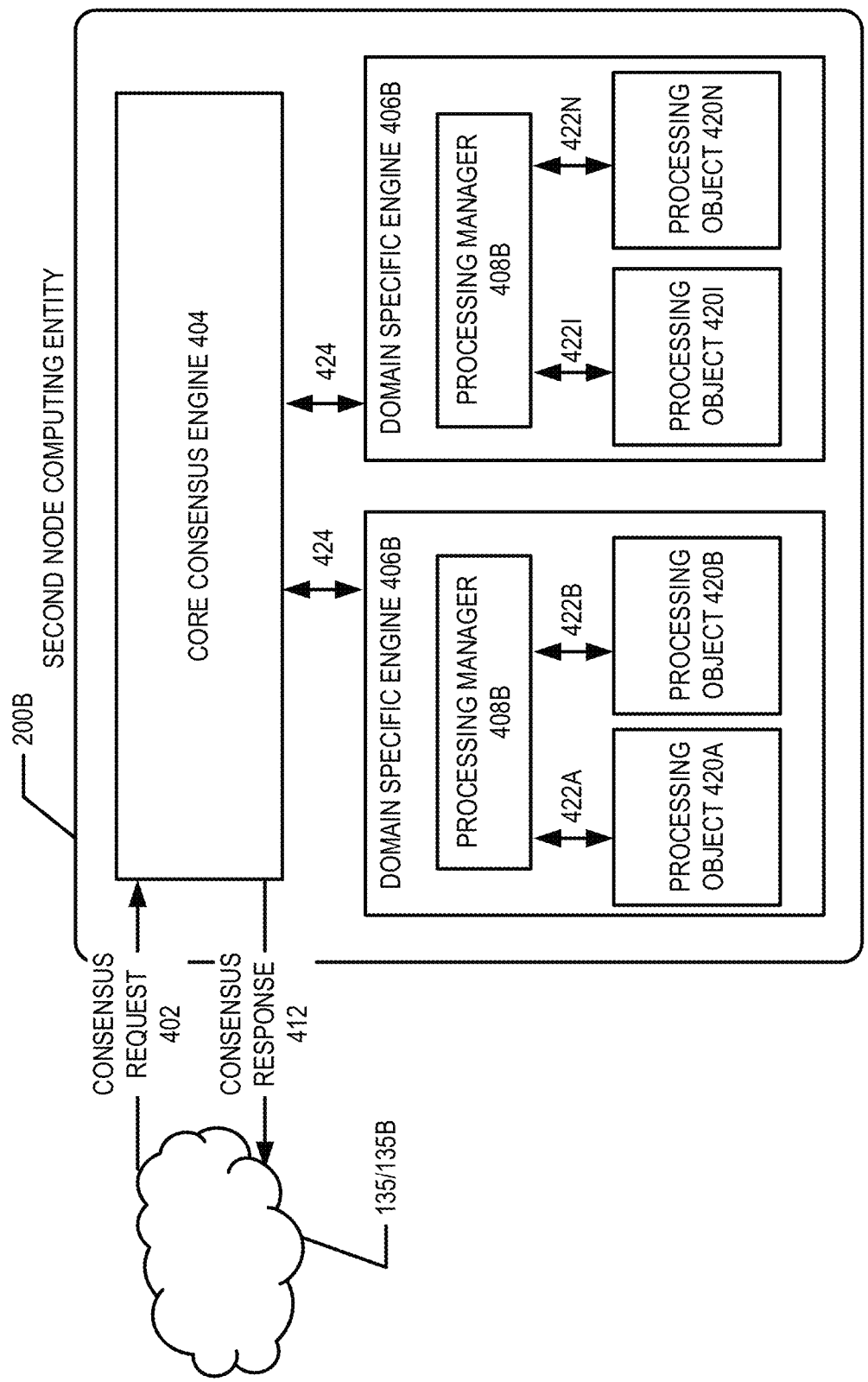
Figure 5:
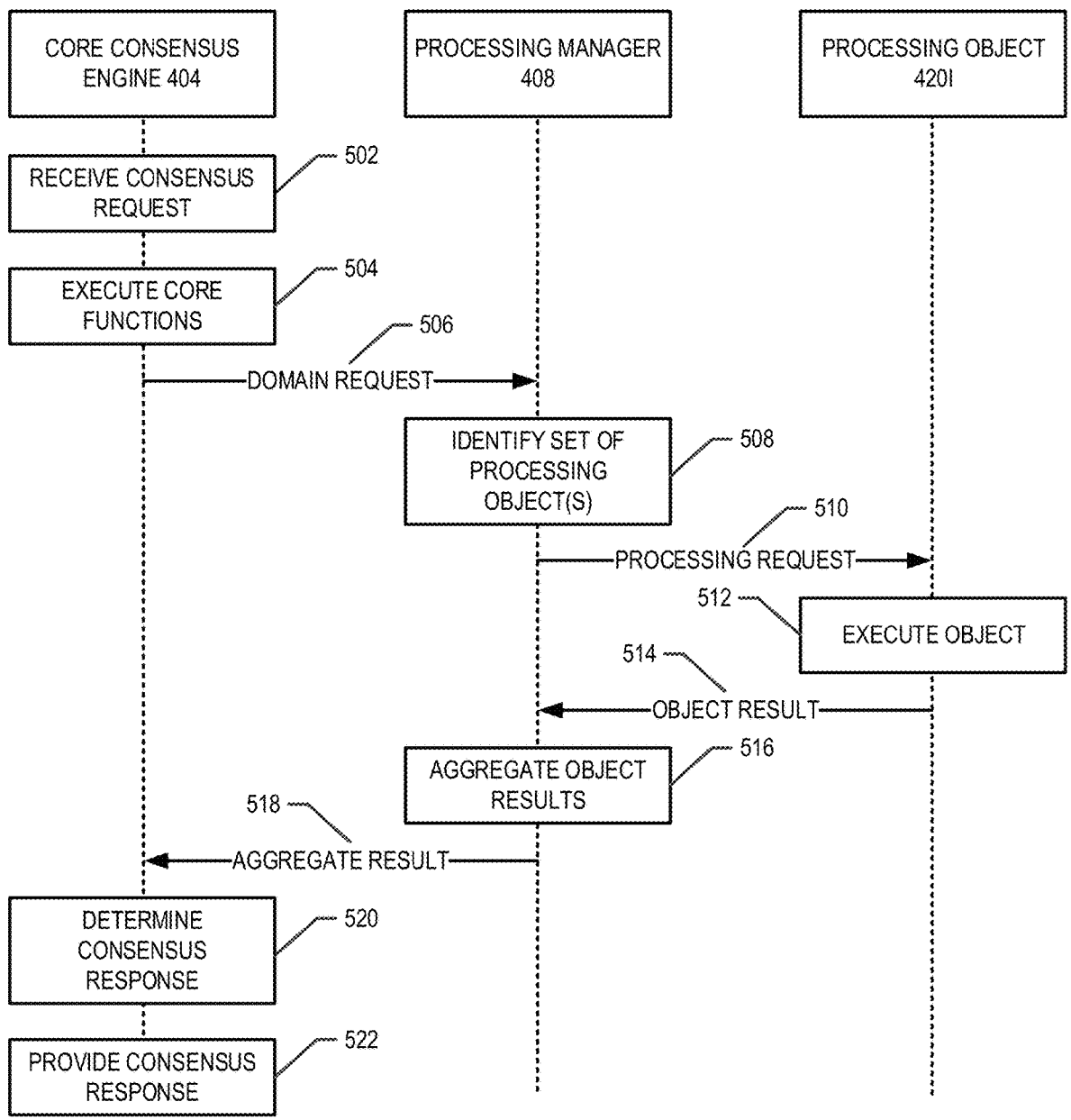

FIGS. 4, 4A, and 4b each provide a block diagram illustrating an example system architecture, in accordance with an example embodiment of the present invention; and FIG. 5 provides a sequence diagram of an example domain and type-specific consensus process, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW

In various embodiments, methods, systems, apparatuses, computer program products, and/or the like are provided consistent consensus processing across a plurality of nodes of a digital ledger implemented in a distributed fashion (e.g., distributed ledger). In various embodiments, a distributed ledger is a data store that is stored by a plurality of nodes that may be geographically separated. In various embodiments, each node of a distributed ledger may comprise one or more node computing entities. The copies of the distributed ledger are stored by the plurality of nodes of the distributed leger. To ensure the validity of information/data stored in the distributed ledger, to ensure events are properly and appropriately carried out, and/or to ensure that events written to the distributed ledger are in the appropriate format, a consensus process may be used. Such consensus models may include proof of work consensus, proof of elapsed time consensus, proof of stake consensus, proof of quality consensus, proof of living consensus, proof of license consensus, and/or the like. In various embodiments, events may be instances of information/data, records, transactions, actions, blocks, and/or the like. Events may be presented for consensus processing, may undergo consensus processing, and/or may be written to the distributed ledger after being confirmed via a consensus process.

For example, a first node computing entity may generate an event based on user input, a smart contract being triggered, a machine user trigger, and/or the like. The first node computing entity may provide a consensus request to one or more second node computing entities. Responsive to receiving the consensus request, each of the one or more second node computing entities may perform a consensus process and provide a consensus response to the first node computing entity. The second node computing entities, and optionally the first node computing entity, are nodes of the distributed ledger network. For example, the second node computing entities and/or the first node computing entities may store a copy of the distributed ledger. If a majority of the consensus responses, all of the consensus responses, at least a threshold number or percentage of the consensus responses, and/or the like validate and/or confirm the event, the event is then written to the distributed ledger.

Thus, the consensus process is used to ensure that the events written to the distributed ledger are valid, are properly and appropriately carried out, are of the appropriate format, and/or the like. It is therefore important that the consensus process be implemented consistently across each of the second node computing entities. However, traditional consensus processes typically have no knowledge of the domain and type of the transaction, leaving the domain and type validation to smart contracts. As noted above, the use of smart contracts in the consensus process may introduce a level of uncertainty or inconsistency in the resulting transactions/events stored to the distributed ledger. Thus, various embodiments of the present invention provide an improvement over traditional consensus processes and distributed ledger management by improving the consistency and certainty of the consensus processes implemented by the second node computing entities.

In various embodiments, the domain and type-specific consensus process of the present invention is implemented using a chain of responsibility pattern. In an example embodiment, each second node computing entity operates and/or executes a core consensus engine that receives a consensus request from a first node computing entity and performs one or more core functions. For example, the core consensus engine may check to confirm that the first node computing entity has permissions consistent with providing an event and/or consensus request, that a previous block hash and/or Merkle root is consistent with events already written to and/or stored in the distributed ledger, that the event is properly formatted, and/or the like. In various embodiments, a Merkle root is the hash of the hashes of the transactions within a block and/or distributed leger entry. The core consensus engine may also interface with a domain specific engine. For example, the core consensus engine may generate and/or provide/pass a domain request to a domain specific engine. In an example embodiment, a domain request may comprise information/data regarding the event from the consensus request, including a type of the event. In an example embodiment, the domain specific engine may comprise a processing manager and a plurality of processing objects. The processing manager may identify a set of one or more processing objects based on the type of the event and call at least one and/or each of the processing objects of the identified set. In an example embodiment, each of the processing objects are called via an application program interface (API) or other interface. Each of the called processing objects may be executed to check information/data regarding the event based on information/data already written to and/or stored in the blockchain, authorities external to the distributed ledger (e.g., a government entity computing device that provides access to public government records, a weather service computing entity that provides access to time-stamped weather information/data, and/or the like). Each of the called processing objects then independently generates an object result based on the execution of the processing object and provides the object result to the processing manager. The processing manager may receive and aggregate the object results to generate an aggregate result. The aggregated result may, in turn, be provided to the core consensus engine. The core consensus engine may generate a consensus response based on the aggregate result and/or the result of the one or more core functions. The consensus response may then be provided to the first node computing entity. The first node computing entity and/or a third node computing entity may receive consensus responses from one or more of the second node computing entities, and based on the received consensus responses and/or distributed ledger protocols, determine if the event is to be written to the distributed ledger. For example, a voting style or lottery style consensus process may be employed such that the consensus responses from one or more of the second node computing entities is used to determine if the event is valid and is to be written to the distributed ledger. In an example embodiment, the distributed ledger is a blockchain.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1A:
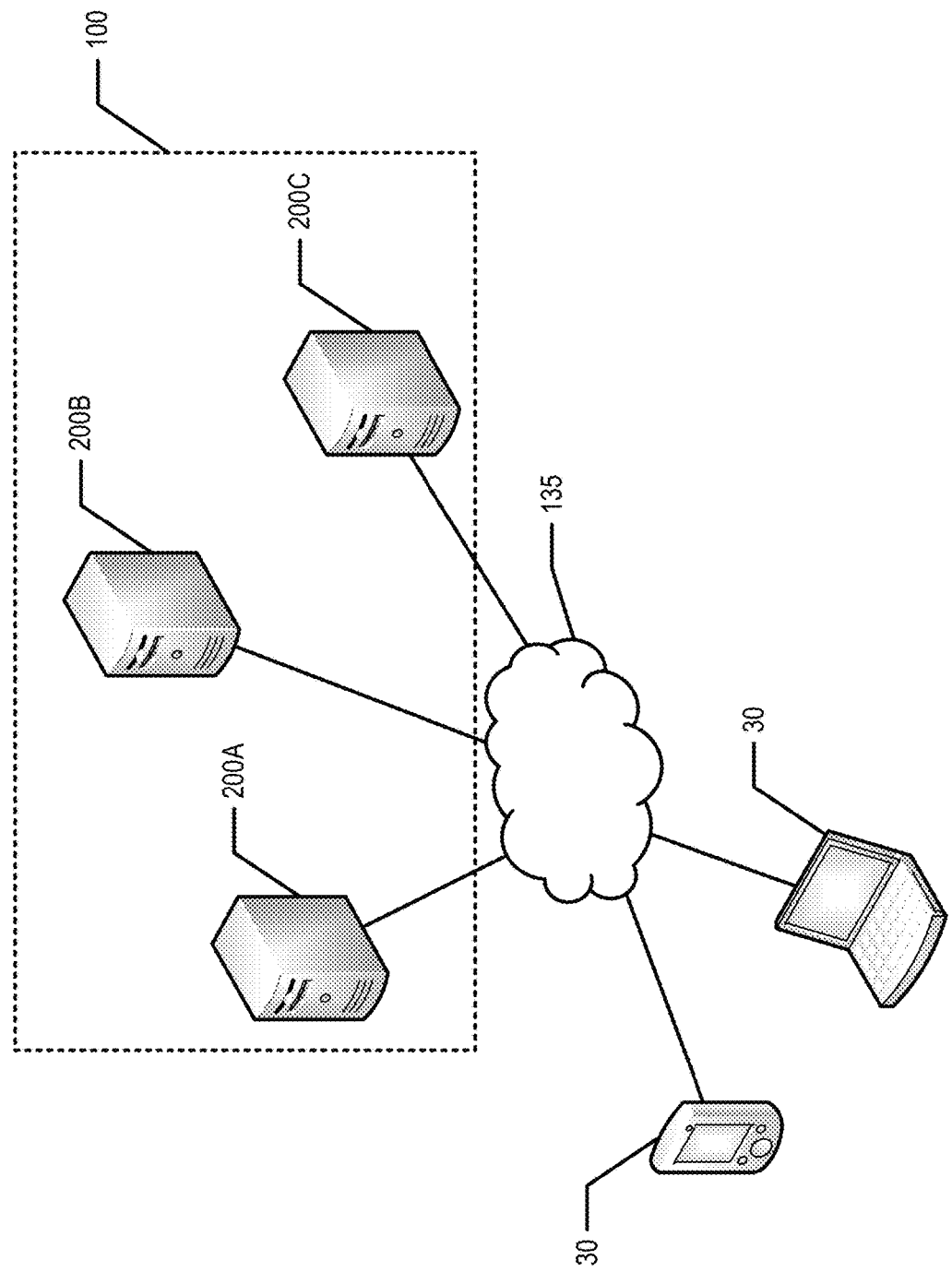
FIG. 1A is a diagram of a system that can be used to practice various embodiments of the present invention.
Figure 1B:
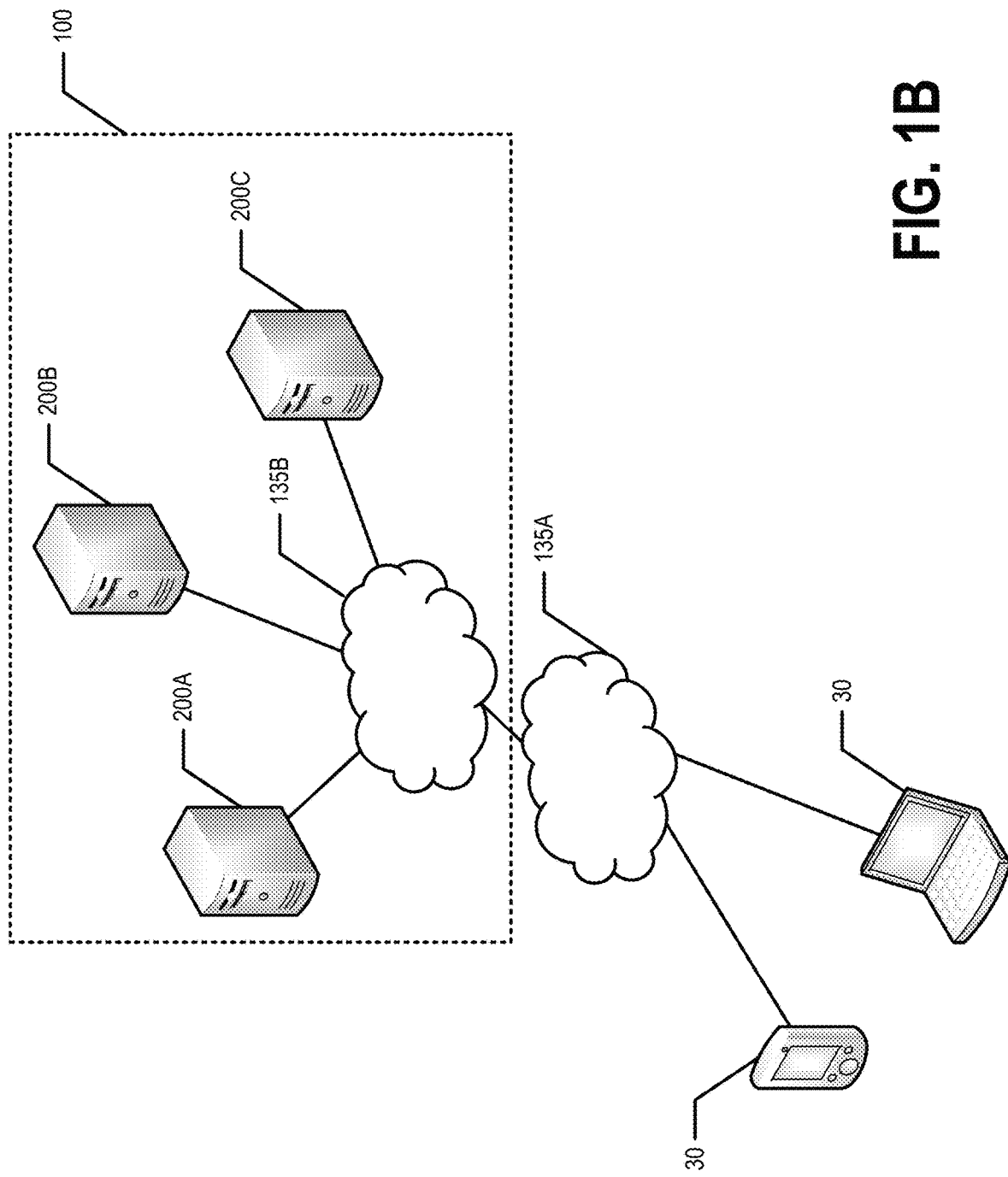
FIG. 1B is a diagram of another system that can be used to practice various embodiments of the present invention.

FIG. 1A provides an illustration of a system that can be used in conjunction with various embodiments of the present invention. As shown in FIG. 1A, the system may comprise a distributed system 100 comprising two or more node computing entities 200 (e.g., 200A, 200B, 200C)'. As shown in FIG. 1A, the system may further comprise one or more non-node computing entities 30, one or more networks 135, and/or the like. FIG. 1B provides an illustration of another system that can be used in conjunction with various embodiments of the present invention. As shown in FIG. 1B, the system may comprise a distributed system 100 comprising two or more node computing entities 200, 200' and one or more internal networks 135B. For example, in an example embodiment, the distributed system 100 comprises a plurality of node computing entities 200, 200' in communication with one another via a network 135B. For example, the network 135B may be an internal or private network. As shown in FIG. 1B, the system may further comprise one or more non-node computing entities 30, one or more other and/or external networks 135A, and/or the like. For example, the other and/or external network 135A may be external, public, and/or a different network from the internal and/or private network 135B. Each of the components of the system may be in electronic communication with, for example, one another over the same or different wireless or wired networks 135, 135A, 135B including, for example, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

FIG. 2 provides a schematic of a node computing entity 200 (e.g., 200A, 200B, 200C) according to one embodiment of the present invention. In general, the terms node computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with other node computing entities 200, 200', one or more non-node computing entities 30, and/or the like.

As shown in FIG. 2, in one embodiment, the node computing entity 200 may include or be in communication with one or more processing elements 205 (also referred to as processors, processing circuitry, and/or similar terms used herein interchangeably) that communicate with other elements within the node computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the node computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the node computing entity 200 with the assistance of the processing element 205 and operating system.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with computing entities or communication interfaces of other node computing entities 200, 200', and/or the like.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 200 components may be located remotely from other node computing entity 200 components, such as in a distributed system. Furthermore, one or more of the components may be combined and additional components performing functions described herein may be included in the node computing entity 200. Thus, the node computing entity 200 can be adapted to accommodate a variety of needs and circumstances.

In example embodiments, the node computing entity 200 may be in communication with one or more other node computing entities 200, 200' and/or one or more non-node computing entities 30. In example embodiments, the node computing entity 200 may be in communication with one or more other node computing entities 200, 200' configured for providing events, consensus requests, and/or the like; performing consensus processing; storing a copy of a distributed ledger; and/or the like.

b. Another Exemplary Node Computing Entity

Figure 3:
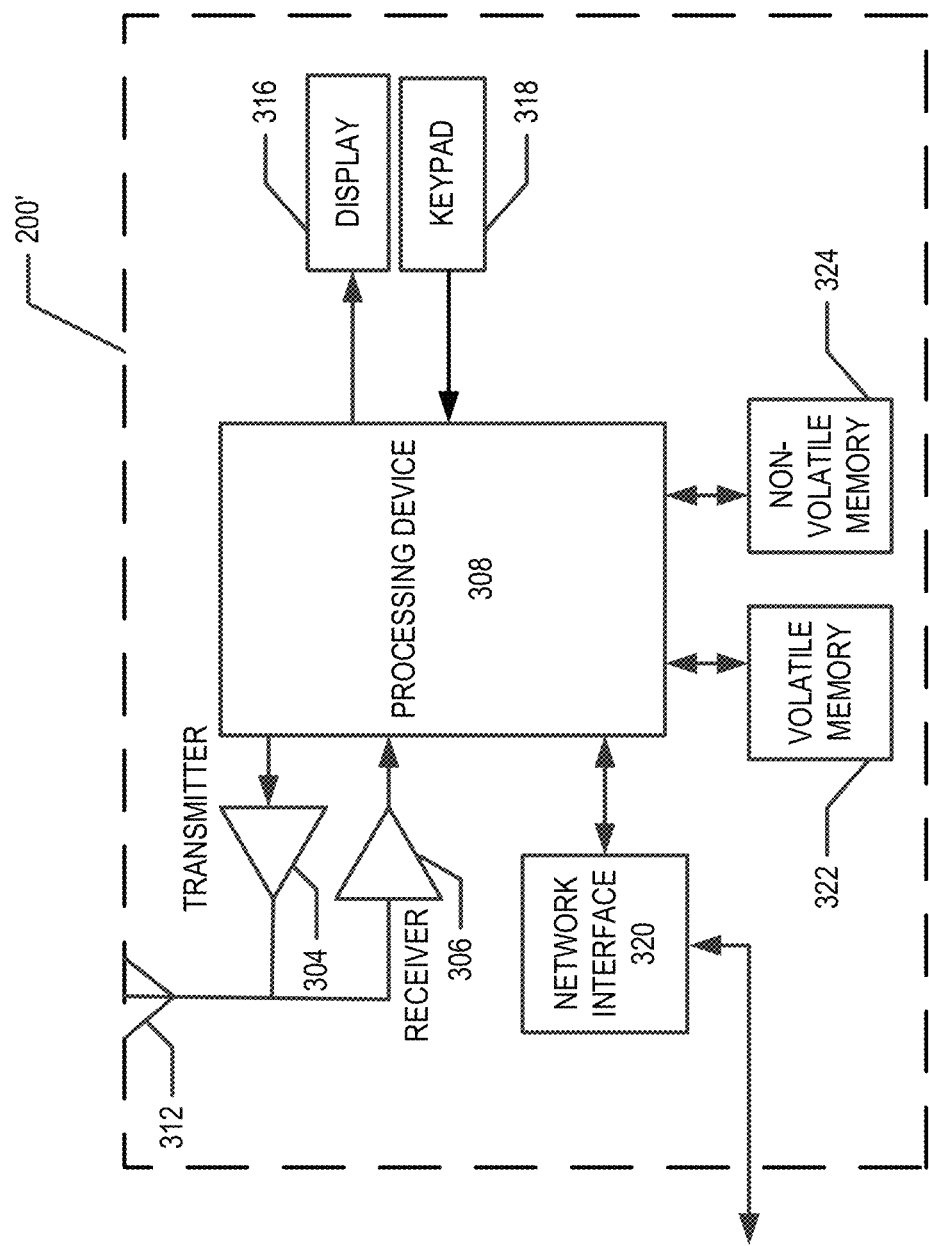
FIG. 3 is a schematic of another node computing entity in accordance with certain embodiments of the present invention.

FIG. 3 provides an illustrative schematic representative of another node computing entity 200' that can be used in conjunction with embodiments of the present invention. As shown in FIG. 3, a node computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another node computing entity 200, 200', one or more non-node computing entities 30, and/or the like. In this regard, the node computing entity 200' may be capable of operating with one or more air interface standards, communication protocols, modulation types, and access types. More particularly, the node computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the node computing entity 200' can communicate with various other entities using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The node computing entity 200' can also download changes, add-ons, and updates, for instance, to its firmware, software (e.g., including executable instructions, applications, program modules), and operating system.

According to one embodiment, the node computing entity 200' may include location determining aspects, devices, modules, functionalities, and/or similar words used herein interchangeably. For example, the node computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the node computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The node computing entity 200' may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the node computing entity 200' to cause display or audible presentation of information/data and for user interaction therewith via one or more user input interfaces. The user input interface can comprise any of a number of devices allowing the node computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the node computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the node computing entity 200' can collect information/data, user interaction/input, and/or the like.

The node computing entity 200' can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the node computing entity 200'.

In example embodiments, the node computing entity 200 may be in communication with one or more other node computing entities 200, 200' and/or one or more non-node computing entities 30. In example embodiments, the node computing entity 200 may be in communication with one or more other node computing entities 200, 200' configured for providing events, consensus requests, and/or the like; performing consensus processing; storing a copy of a distributed ledger; and/or the like.

c. Exemplary Non-Node Computing Entity

In an example embodiment, a non-node computing entity 30 may be a computing entity configured for user interaction (e.g., via one or more user interface devices thereof) for receiving, generating, and/or providing events and/or information related thereto. In various embodiments, a user may be a person interacting with a non-node computing entity 30 (e.g., via the user interface devices thereof) or a machine user (e.g., an application, service, and/or the like operating on the non-node computing entity 30). In various embodiments, the non-node computing entity 30 may be a computing entity external to the distributed ledger. For example, a non-node computing entity 30 may be an external authority computing entity, such as a government entity computing device storing and/or providing access to public government records (e.g., death certificates, rules and regulations, police reports, tax records, and/or the like); a weather service computing device storing and/or providing current and/or historical weather information/data, and/or the like. For example, a non-node computing entity 30 may be another computing device operated by and/or on behalf of an external authority and storing and/or providing other information/data that may be requested, accessed, and/or the like by one or more processing objects. For example, a non-node computing entity 30 may be a computing device hosting a website for an entity, and/or the like.

In an example embodiment, a non-node computing entity 30 may be in communication with one or more node computing entities 200, 200' via one or more wired or wireless networks 135. In one embodiment, the non-node computing entity 30 may include one or more components that are functionally similar to those of a node computing entity 200, 200'. For example, in one embodiment, a non-node computing entity 30 may include: (1) a processing element that communicates with other elements via a system interface or bus; (2) one or more user interface devices (e.g., display, touchscreen display, hard or soft keyboard, mouse, and/or the like); (3) transitory and non-transitory memory; and (4) a network and/or communications interface configured to communicate via one or more wired or wireless networks 135. For example, the non-node computing entity 30 may receive user input (e.g., via the user input interface thereof) and provide (e.g. transmit) an indication of the user input to one or more node computing entities 200, 200' (e.g., via the network and/or communications interface).

d. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXEMPLARY SYSTEM OPERATION

Various embodiments provide a distributed ledger having a domain and/or type-specific consensus process. Various embodiments provide a consensus process for a distributed ledger that is domain and/or type-specific. Such embodiments provide an improved consensus process over traditional distributed ledger consensus processes. For example, various embodiments eliminate, reduce, and/or minimize the risk that multiple versions of smart contracts are used for performing validity and/or acceptance checks for a distributed ledger by supplementing, eliminating, reducing, and/or minimizing the use of smart contracts in the consensus and/or validation processes. Further, various embodiments improve the data quality, dependability, and/or validity of a distributed ledger, such as, for example, in a blockchain data store. Additionally, various embodiments incorporate a flexible pluggable and/or extensible consensus process design that may be easily expanded and/or modified as desired by an administrative entity of the distributed ledger. Moreover, various embodiments of the present invention may be incorporated into lottery-based, voting-based, and/or a variety of other consensus processes and/or methods. As will be recognized, in one embodiment, the distributed ledger is a blockchain data store/database and/or the like.

FIG. 4 provides a block diagram of an example software architecture that may be used in an implementation of an example embodiment. In this example, a core consensus engine 404 may be provided by executing corresponding computer program code by a processor (e.g., processing element 205, processing device 308) of a second node computing entity 200B. In an example embodiment, the computer program code corresponding to the core consensus engine 404 is stored in memory (e.g., memory 210, 215, 322, 324) of the second node computing entity 200B or in a computer-readable storage medium that is accessible to the second node computing entity 200B. In various embodiments, the core consensus engine 404 may be configured, programmed, and/or the like to receive a consensus request 402 and provide a consensus response 412. For example, the core consensus engine 404 may receive the consensus request 402 via the communications interface (e.g., network interface 220, 320, receiver 306, and/or the like). For example, the core consensus engine 404 may instruct and/or cause the communications interface (e.g., network interface 220, 320, transmitter 304, and/or the like) to provide, transmit, and/or the like the consensus response 412. In an example embodiment, the consensus request 402 is generated and/or provided by a first node computing entity 200A. In an example embodiment, the core consensus engine 404 operates on, is executed by, and/or the like one or more second node computing entities 200B. In an example embodiment, the consensus response 412 provided, transmitted, and/or the like by a second node computing entity 200B is received by the first node computing entity 200A.

In an example embodiment, the consensus request 402 corresponds to an event. In an example embodiment, an event is one or more instances of information/data, records, transactions, actions, blocks, and/or the like. Events may be presented for consensus processing, may undergo consensus processing, and/or may be written to the distributed ledger after being validated and/or confirmed via a consensus process. An event may correspond to a domain and/or have a type. In various embodiments, the term domain refers to a particular sphere or area of knowledge, business, industry, and/or the like. Some non-limiting examples of domains are healthcare, finance, retail, digital rights, voting, supply chain management, and/or the like. In various embodiments, the term type refers to the further specialization of the domain to a specific class of transactions, data, event and/or the like. For example, if the domain is healthcare, some non-limiting examples of types of events or transactions are verifying the regulatory compliance of a submitted claim, confirming the address of a provider, verifying the patient has consented to share their information, etc. The consensus request 402 may indicate and/or comprise of a domain and/or type for the corresponding event. For example, the consensus request 402 may comprise an indication of a domain and/or type of the corresponding event. In an example embodiment, the consensus request 402 comprises a copy of an event proposed for inclusion in the distributed ledger, event information/data (which may be provided as the copy of the event), and a request for consensus processing thereof. In an example embodiment, the consensus request 402 comprises metadata about the event (e.g., timestamp, identify of the transaction proposer/event initiator), and/or other metadata.

Responsive to receiving and/or processing the consensus request 402, the core consensus engine 404 may perform one or more core functions, identify a domain corresponding to the event (e.g., based on a domain indicated by the consensus request 402), provide at least a portion of the consensus request 402 to a domain specific engine 406 corresponding to the identified domain (e.g., as a domain request), and/or the like. Some non-limiting examples of core functions include checking a prior block hash, checking a hash of Merkle root or tree, and/or the like of the event based on other events written to and/or stored in the distributed ledger; checking the permissions of the first node computing entity 200A and/or a user associated with the event to ensure the first node computing entity 200A and/or user has appropriate permissions for providing an event; checking that the request would not exceed architectural limits such as the block size; have too few transactions to make an efficient block; and/or the like. In an example embodiment, user and/or first node computing entity 200A permissioning may be domain and/or type specific and the check of such user and/or first node computing entity permissions may be performed by a processing object 420$i$. In another example embodiment, the core consensus engine 404 may perform one or more permissions checks. In an example embodiment, the core functions are consensus processes, checks, validations, and/or the like that do not require any domain and/or event type knowledge. For example, core functions are consensus processes, checks, validations, and/or the like that are the same for events of any domain and/or type. In an example embodiment, the core functions may comprise executing at least a portion of one or more smart contracts. For example, the core consensus engine 404 may call smart contract 430 via interface 432.

The core consensus engine 404 may generate and/or provide a domain request comprising at least a portion of the information/data provided by the consensus request 402 to the domain specific engine 406 via interface 424. For example, the core consensus engine 404 may call the domain specific engine 406, cause computer program code corresponding to the domain specific engine to be executed by the processor (e.g., processing element 205, processing device 308) of the second node computing entity 200B, and/or the like. In an example embodiment, the computer program code corresponding to the domain specific engine 406 is stored in memory (e.g., memory 210, 215, 322, 324) of the second node computing entity 200B or in a computer-readable storage medium that is accessible to the second node computing entity 200B. In an example embodiment, the interface 424 is an API. In an example embodiment, the core consensus engine 404 may be further configured to receive consensus requests 402 that may not correspond to a particular domain. For example, a consensus request 402 may correspond to an aspect of managing the distributed ledger and may not correspond to a particular domain or domain-specific type. In such an instance, the core consensus engine 404 may perform the consensus process without calling a domain specific engine 406.

In various embodiments, the domain specific engine 406 comprises a processing manager 408 and a plurality of processing objects 420 (e.g., 420A, 420B, . . . , 420N). In an example embodiment, each processing object 420 is an individual and/or pluggable module and/or the like configured and/or programmed to perform a domain and/or type-specific function. For example, a pluggable module may be a set of computer program code, executable portions, and/or the like that may be accessed, updated, and/or the like independently of the remainder of the computer program code corresponding to the domain specific engine 406. For example, a pluggable module may be plugged into the domain specific engine 406. In an example embodiment, the processing manager is configured to communicate and/or interface with each processing object 420 via a corresponding interface 422 (e.g., 422A, 422B, . . . , 422N). In an example embodiment, the interface 422 is an API.

In an example embodiment, the computer program product corresponding to the domain specific engine 406 may be configured to be automatically updated. For example, updates to the computer program product may be provided, pushed, and/or the like to each of the second node computing entities 200B to ensure the that computer program code executed by the second node computing entities 200B to provide and/or operate the domain specific engine 406 is the same version and/or consistent across the second node computing entities 200B. In another example embodiment, the computer program code corresponding to the domain specific engine 406 may be stored by, for example, a third node computing entity 200C or other server, and accessed by the second node computing entity 200B as client software. In an example embodiment, computer program products corresponding to portions of the domain specific engine 406 (e.g., the processing manager 406, a table, list, and/or the like of available processing objects 420, and/or the like) and the processing objects 420 may be accessed by the second node computing entity 200B as client software. In an example embodiment, a domain specific engine 406 may be replaced with a new version of the domain specific engine 406. For example, a new version of the domain specific 406 may be installed on a second node computing entity 200B that supersedes previous versions of the domain specific engine 406. In another example embodiment, the update or addition of a processing object may be performed via the validation of a transaction by another processing object. For example, a change in consensus transaction may be formed and/or created in a block that provides the updated and/or new processing object. In various embodiments, when a domain specific engine 406 is updated and/or replaced, the previous version is retained such that transactions and/or distributed ledger entries that were processed using a previous and/or older version of the domain specific engine 406 may be independently verified via use of the corresponding version of the domain specific engine 406.

In an example embodiment, responsive to the domain request comprising event information/data and/or at least a portion of the consensus request 402 being passed to the domain specific engine 406 and/or processed thereby, the processing manager 408 may identify a type of the event. For example, responsive to receiving domain request, the processing manager 408 may identify a type of the corresponding event and identify a set {420i} of one or more processing objects 420 based on the identified type. For example, if the domain is healthcare and the type is verifying the address of a provider, the identified set {420i} of one or more processing objects 420 may comprise a first processing object configured to check a first database of address information/data to confirm the provided address exists, a second processing object configured to check a provider license database to confirm the provider's license is registered to the address; a third processing object configured to check a second database of address information/data to confirm the provider's name is associated with the address; and/or the like. In an example embodiment, two or more processing objects may be configured to confirm, validate, and/or the like the same information/data corresponding to the event using different sources. For example, the processing objects 420 may comprise a first processing object configured to validate a provider's address using a government records database and a second processing object configured to validate a provider's address using the Yellow Pages, and/or other address database. In another example, the processing objects 420 may comprise one or more processing objects that are each configured to confirm one of the provider's address, the provider's phone number, that the provider has a valid license, and/or the like.

In another example embodiment, the set {420i} of one or more processing objects 420 may be identified based on a list of processing objects provided in the genesis block and/or the like of the distributed ledger. For example, the genesis block of the distributed ledger may comprise a list processing objects corresponding to each of one or more domains. The processing manager may then access the set {420i} of processing objects based on the hash, uniform resource locator (URI) and/or the like corresponding to each of the processing objects of the set {420i}. For example, the list of processing objects may comprise the URI, a hash (e.g., a hash of the URI) and/or the like for each of the processing objects corresponding to one or more domains such that when a consensus request 402 corresponding to a first domain is received, the processing manager 406 may identify and locate the set {420i} of one or more processing objects corresponding to the first domain. In an example embodiment, the processing objects are stored in and/or by the distributed ledger itself. In an example embodiment, when an update is made to the processing objects, the distributed ledger may be forked and a new genesis block may be generated and stored to the distributed ledger that comprises the updated list of processing objects corresponding to one or more domains.

In an example embodiment, the processing manager 408 calls, invokes, and/or causes the execution of computer program code corresponding to at least one processing object 420i of the set {420i} of one or more processing objects 420. For example, the processing manager 408 may generate and/or provide and/or pass a processing request to one or more processing objects 420i of the set {420i} of the one or more processing objects 420i identified based on the type of the event. In an example embodiment, the processing request may comprise at least a portion of the event information/data, at least a portion of the domain request, at least a portion of the consensus request 402, and/or the like. In an example embodiment, responsive to the processing request being issued by the processing manager 408 (e.g., to an interface 422i corresponding to a processing object 420i), the processing object 420i may be executed by the processor (e.g., processing element 205, processing device 308) of the second node computing entity 200B to access any required information/data not provided by the processing manager 408 (e.g., from the distributed ledger and/or from one or more non-node computing entities 30), generate an object result based on the processing request and any required information/data accessed by the processing object 420i. The processing object 420i may then provide and/or pass the object result to the processing manager 408 via the interface 422i. In an example embodiment, the processing objects 420i of the set {420i} of one or more processing objects 420 may be called, invoked, executed, and/or the like in series. For example, responsive to receiving and/or processing an object result provided by a first processing object 420A of the set {420i}, the processing manager 408 may then call a second processing object 420B of the set {420i}. In another example, the processing objects 420i of the set {420i} of one or more processing objects 420 may be called, invoked, executed, and/or the like in parallel. For example, the second processing object 420B may be called at approximately the same time as the first processing object 420A and/or before the processing manager 408 receives the object result from the previously-called, first processing object 420A.

In various embodiments, an object result may comprise a veto, a confidence level, an approval rating, an approval, and/or the like. In an example embodiment, a veto may be an object result that indicates that the event should not be written to the distributed ledger. For example, if the event is an update of healthcare provider's practice information/data that indicates that a provider is still practicing, but a death certificate for the provider is identified or a retraction of the provider's license is identified, the corresponding content object may generate and provide an object result comprising a veto. Responsive to receiving an object result that comprises a veto, in an example embodiment, the processing manager 408 may cease the calling, invoking, and/or causing of execution of the remainder of the processing objects 420*i* of the set {420*i*} (e.g., if the processing objects 420*i* of the set {420*i*} are being operated and/or executed in series) and provide an aggregated result to the core consensus engine 404 indicating that the event cannot be validated, did not pass validation, should not be written to the distributed ledger, and/or the like. In various embodiments, the object result may comprise a confidence level. For example, a processing object 420*i* may determine a confidence level based on the information/data provided by the processing manager 408 and any required information/data accessed by the processing object 420*i* that the event, event information/data, and/or a portion thereof is valid, confirmed, and/or the like (e.g., based on the execution of the computer program code of the processing object 420*i*). For example, the confidence level may indicate a percentage and/or likelihood that the event, event information/data and/or a portion thereof is valid, confirmed, and/or the like. In an example embodiment, an object result may comprise an approval rating indicating a strength with which the processing object 420*i* recommends the event be approved and/or not be approved for writing to the distributed ledger. For example, a processing object 420*i* may determine an approval rating based on processing of the information/data provided by the processing manager 408 and any required information/data accessed by the processing object 420*i* that the event, event information/data, and/or a portion thereof is valid, confirmed, and/or the like (e.g., based on the execution of the computer program code of the processing object). In various embodiments, the object result may comprise an approval. For example, a processing object 420*i* may validate and/or confirm the event, event information/data and/or a portion thereof and provide an object result indicating that the event, event information/data, and/or a portion thereof has been validated and/or confirmed.

The processing manager 408 may be configured and/or programmed to receive the object results from the processing objects 420*i* of the set {420*i*} of one or more processing objects 420 identified based on the type of the event. The processing manager may be configured and/or programmed to analyze and/or aggregate the object results received from the processing objects 420*i* of the set {420*i*} to generate an aggregate result. In an example embodiment, the processing manager 408 may receive a first object result from a first processing object 420A and determine a score based on the first object result. The processing manager may then provide the first object result to a second processing object 420B and receive a second object result from the second processing object 420B and determine a score that considers both the first object result and the second object result. The processing manager 408 may then continue to sequentially call processing objects 420 until a threshold requirement is satisfied. For example, the threshold requirement may be calling a minimum number of processing objects 420, the score indicates a minimum level of confidence in the confirmed and/or validated information/data, and/or the like.

In an example embodiment, the aggregate result may be an average, sum, weighted average, weighted sum, and/or the like of the confidence levels and/or approval ratings provided by the object results. In an example embodiment, the processing manager 408 may generate an aggregated score (e.g., an average, sum, weighted average, weighted sum, and/or the like) based on the confidence levels and/or approval ratings provided by the object results determine if the aggregated score satisfies a first threshold requirement. In such an embodiment, the aggregate result may be an approval of the event if the aggregate score satisfies first threshold requirement and a veto of the event if the aggregate score does not satisfy the first threshold requirement. In another example embodiment, the aggregate result may be an approval of the event if the aggregate score satisfies a first threshold requirement, a tentative approval if the aggregate score does not satisfy a first threshold requirement but does satisfy a second threshold requirement, and a veto of the event if the aggregate score does not satisfy the second threshold requirement. In various embodiments, the first and/or second threshold requirements may be predetermined, predefined, or configurable based on an intended application and/or administrative preferences corresponding to the distributed ledger.

In an example embodiment, a first processing object may provide an object result comprising a confidence level or approval rating and a second processing object may provide an object result comprising an approval. In such instances, the approval may be considered a 100% confidence level and/or a strongly positive approval rating when determining the aggregate score and/or aggregate result. In an example embodiment, if one or more processing objects provide object results that comprise a veto, the aggregate result may be a veto and/or an indication that the domain specific engine 406 does not suggest and/or support validating the event and/or writing the event to the distributed ledger. In an example embodiment, if a processing object provides object result that comprises a veto, the veto may be considered as 0% or a very low confidence level and/or a strongly negative approval rating when determining the aggregate score and/or aggregate result.

The processing manager 408 provides the aggregate result to the core consensus engine 404 via the interface 424. Responsive to receiving the aggregate result, the core consensus engine 404 may generate a consensus response 412. For example, the consensus response 412 may be generated based on the aggregate result and/or the result of the core function(s). In an example embodiment, the consensus response 412 indicates either that the second node computing entity 200B (e.g., via the execution of the core consensus engine 404 and/or the domain specific engine 406) has satisfactorily validated the event corresponding to the consensus request 402 or that the second node computing entity 200B (e.g., via the execution of the core consensus engine 404 and/or the domain specific engine 406) was not able to satisfactorily validate the event corresponding to the consensus request 402. In various embodiments, the second node computing entity 200B may not be able to satisfactorily validate an event corresponding to a consensus request 402 because the confidence level with which the event, event information/data and/or a portion thereof may be validated does not satisfy a validation approval threshold, because at least one instance of information/data of the event has been determined to be incorrect or false in whole and/or in part, because the user and/or first node computing entity 200A submitting the consensus request does not have appropriate permissions to submit an event and/or an event of the type corresponding to the event, because the event is improperly formatted, and/or the like.

The core consensus engine 404 may then cause the communications interface (e.g., network interface 220, 320, transmitter 304, and/or the like) to provide, transmit, and/or the like the consensus response 412. The first node computing entity 200A and/or one or more third node computing entities 200C may receive consensus responses 412 from one or more second node computing entities 200B and, based on the rules, protocols, and/or the like of the distributed ledger, determine if the event is verified based on the received consensus responses 412 (e.g., a majority of second node computing entities 200B agree that the event should be verified, one or more selected second node computing entities 200B agree that the vent should be verified, and/or the like). If it is determined that the event is verified one or more node computing entities 200 (e.g., 200A, 200B, 200C) then write the event to their locally stored ledger of the distributed ledger. If it is determined that the event is not verified, the first node computing entity 200A and/or a non-node computing entity 30 may provide an error message, notification, alert, and/or the like to the user and/or application from which the event originated. In an example embodiment, a block of events are verified at a time.

FIGS. 4A and 4B illustrate block diagrams of alternative example software architectures that may be used in example embodiments. In the example architecture illustrated in FIG. 4A, the domain specific engine 406A does not comprise a processing manager 408. In an example embodiment, the domain specific engine 406A calls each of the processing objects 420i, rather than selecting a particular set {420i} of processing objects 420i. Processing objects 420i that are not relevant to the consensus request 402, return a null response or other indication that any response from that processing object is not to be considered in the determination of the aggregate result. For example, the processing object 420i itself may determine the domain and/or type of the event and determine if the domain and/or type of the event is relevant to the processing object.

In the example architecture illustrated in FIG. 4B, the node computing entity 200 comprises a domain specific engine 406B that is particular to a domain. For example, the node computing entity 200 may comprise a plurality of domain specific engines 406B, which each domain specific engine 406B being particular to a corresponding domain. For example, the domain specific engine 406B may store information/data identifying the processing objects 420 corresponding to the corresponding domain. In an example embodiment, a domain specific engine 406B may correspond to a domain and a type. In another example embodiment, a domain specific engine 406B may comprise a plurality of processing managers 408B that are each correspond to a type.

FIG. 5 provides a sequence diagram illustrating various processes, procedures, and/or operations and the flow of control and/or information/data of an example domain and/or type-specific consensus process, according to an example embodiment. At 502, the core consensus engine 404 operating on and/or executed by a second node computing entity 200B receives a consensus request 402. For example, a first node computing entity 200A may provide (e.g., transmit) a consensus request 402 corresponding to an event. In an example embodiment, the consensus request 402 comprises event information/data corresponding to the event, a domain corresponding to the event, a type of the event, and/or the like. The communications interface (e.g., network interface 220, 320, receiver 306, and/or the like) of the second node computing entity 200B may receive the consensus request 402 and be passed, provided to, and/or the like the core consensus engine 404. In an example embodiment, the core consensus engine 404 is called and/or execution of the core consensus engine by the processor (e.g., processing element 205, processing device 308) of the second node computing entity 200B is initiated in response to the receipt of the consensus request 402. Thus, the core consensus engine 404 receives the consensus request 402 and, responsive thereto, processes the consensus request 402, in an example embodiment.

At 504, the core consensus engine 404 may perform, operate, and/or execute one or more core functions. For example, in various embodiments, core functions are consensus processes, checks, validations, and/or the like that do not require any domain and/or event type knowledge. For example, core functions are consensus processes, checks, validations, and/or the like that are the same for events of any domain and/or type. In an example embodiment, the core functions may comprise executing at least a portion of one or more smart contracts. Some non-limiting examples of core functions include checking a prior block hash, Merkle root, and/or the like of the event based on other events written to and/or stored in the distributed ledger; checking the permissions of the first node computing entity 200A and/or a user associated with the event to ensure the first node computing entity 200A and/or user has appropriate permissions for providing an event; and/or the like. In an example embodiment, user and/or first node computing entity 200A permissioning may be domain and/or type specific and the check of such user and/or first node computing entity permissions may be performed by a processing object 420i.

At 506, the core consensus engine 404 may generate and/or provide a domain request. In an example embodiment, the domain request comprises and/or is at least a portion of the consensus request. For example, the domain request may comprise event information/data from the consensus request, the type of the event, and/or the like. In an example embodiment, the domain request comprises the event and the type. For example, the core consensus engine 404 may call, invoke, and/or cause computer program code to be executed by the second node computing entity 200B to provide a domain specific engine 406. In an example embodiment, the domain specific engine 406 receives the domain request via interface 424. The domain specific engine 406 comprises a processing manager 408 and a plurality of processing objects 420 (e.g., 420A, 420B, . . . , 420N). The processing manager 408 may receive the domain request.

Responsive to receiving the domain request, the processing manager 408 may process the domain request. As part of processing the domain request, the processing manager 408 may identify the type of the event and, based on the type, identify a set {420i} of one or more processing objects 420i, at 508. For example, the processing manager 408 may operate and/or be executed to identify a set {420i} of one or more processing objects 420i that are associated with the type of the event. In an example embodiment, the set {420i} may be an ordered set such that the order of the processing objects 420*i* within the set {420*i*} indicates the order with which the processing objects 420*i* should be called, invoked, executed, and/or the like.

In an example embodiment, the processing manager 408 may generate and/or provide one or more processing requests. Each processing request may correspond to a processing object 420*i* of the set {420*i*} of one or more processing objects 420*i* identified based on the type of the event. For example, a first processing request corresponding to a first processing object 420A of the set {420*i*} may comprise and/or consist of event information/data and/or a portion of the event needed for execution of the first processing object 420A and a second processing request corresponding to a second processing object 420B of the set {420*i*} may comprise and/or consist of event information/data and/or a portion of the event needed for execution of the second processing object 420B. In an example embodiment, the processing manager 408 may pass, provide, and/or the like the one or more processing requests to the corresponding processing objects 420*i* via the corresponding interfaces 422*i*. In an example embodiment, the processing requests may be provided, passed, and/or the like to the processing objects 420*i* in series (e.g., in response to receiving an object result from first processing object 420A, the processing manager 408 may provide/pass a processing request to a second processing object 420B) or in parallel (e.g., the processing manager 408 provides the processing requests to two or more processing objects 420*i* at generally the same time and/or before receiving an object result from a previously called processing object). At 510, the processing manager 408 may provide a processing request to a corresponding processing object 420*i* and the processing object 420*i* may receive the processing request. For example, the processing manager 408 may call, invoke, and/or cause computer program code to be executed to provide the processing object 420*i*. The processing object 420*i* may receive the processing request via the corresponding interface 422*i*.

At 512, the processing object 420*i* may be operated and/or executed to process the processing request, access any required information/data not provided by the processing manager 408 (e.g., from the distributed ledger and/or from one or more non-node computing entities 30), generate an object result based on the processing request and any required information/data accessed by the processing object 420*i*, and/or the like. For example, the processing object 420*i* may submit an information/data request to read information/data stored in the distributed ledger. For example, the processing object 420*i* may submit an information/data request to one or more non-node computing entities 30 to retrieve information/data stored and/or accessible via the non-node computing entities 30 and receiving at least a portion of the requested information/data. The processing object may then operate and/or be executed to process information/data from the processing request, information/data read from the distributed ledger, and/or information/data received from one or more non-node computing entities 30 to generate an object result.

In various embodiments, an object result may comprise a veto, a confidence level, an approval rating, an approval and/or the like. In an example embodiment, a veto may be an object result that indicates that the event should not be written to the distributed ledger. For example, if the event is an update of healthcare provider's practice information/data that indicates that a provider is still practicing, but a death certificate for the provider is identified or a retraction of the provider's license is identified, the corresponding content object may generate and provide an object result comprising a veto. Responsive to receiving an object result that comprises a veto, the processing manager 408 may cease the calling, invoking, and/or causing of execution of the remainder of the processing objects 420*i* of the set {420*i*} of one or more processing objects 420*i* (e.g., if the processing objects 420*i* of the set {420*i*} are being operated and/or executed in series) and may provide an aggregated result to the core consensus engine 404 indicating that the event cannot be validated, did not pass validation, should not be written to the distributed ledger, and/or the like. In various embodiments, the object result may comprise a confidence level. For example, a processing object 420*i* may determine a confidence level based on the information/data provided by the processing manager 408 and any required information/data accessed by the processing object 420*i* that the event and/or a portion of the event and/or event information/data is valid, confirmed, and/or the like (e.g., based on the execution of the computer program code of the processing object). For example, the confidence level may indicate a percentage and/or likelihood that the event, the event information/data, and/or a portion thereof is valid, confirmed, and/or the like. In an example embodiment, an object result may comprise an approval rating indicating a strength with which the processing object 420*i* recommends the event be approved and/or not be approved for writing to the distributed ledger. For example, a processing object 420*i* may determine an approval rating based on processing of the information/data provided by the processing manager 408 and any required information/data accessed by the processing object 420*i* that the event, event information/data, and/or a portion thereof is valid, confirmed, and/or the like (e.g., based on the execution of the computer program code of the processing object). In various embodiments, the object result may comprise an approval. For example, a processing object 420*i* may validate and/or confirm the event, event information/data, and/or a portion thereof and provide an object result indicating that the event, event information/data, and/or a portion thereof has been validated and/or confirmed.

At 514, the processing object 420*i* provides, passes, and/or the like the object result. For example, the processing manager 408 may receive the object result generated by the processing object 420*i* via the corresponding interface 422*i*. In an example embodiment in which the processing objects 420*i* are called in series, the processing manager may process the object result to ensure the object result does not comprise a veto, and then, responsive to the object result not comprising a veto, providing and/or passing the next processing request to the next processing object 420*i*. In an example embodiment, if the object result comprises a veto, the processing manager 408 may not provide the next processing request to the next processing object and may provide an aggregate result to the core consensus engine 404 that indicates the event could not be validated, that the event should not be written to the distributed ledger, and/or the like.

At 516, after receiving object results from at least one of the processing objects 420*i* of the set {420*i*} of one or more processing objects 420*i* identified based on the type of the event, the processing manager 408 may aggregate, analyze, and/or the like the at least one object result to generate an aggregate result. For example, the one or more processing objects 420*i* of the set {420*i*} of one or more processing objects 420*i* identified based on the type of the event may provide and/or pass object results to the processing manager 408. In an example embodiment, responsive to receiving object results from each of the processing objects 420i in the set {420i} of one or more processing objects (and/or from each of the processing objects 420i in the set {420i} that were called), the processing manager 408 may determine and/or generate an aggregate result. For example, the processing manager 408 may analyze and/or aggregate the object results received from the processing objects 420i of the set {420i} to generate an aggregate result. In an example embodiment, the aggregate result may be an average, sum, weighted average, weighted sum, and/or the like of the confidence levels and/or approval ratings provided by the object results. In an example embodiment, the processing manager 408 may generate an aggregate score (e.g., average, sum, weighted average, weighted sum, and/or the like) based on the confidence levels and/or approval ratings provided by the object results and determine if the generated aggregate score satisfies a first threshold requirement. In such an embodiment, the aggregate result may be an approval and/or validation of the event if the aggregate score satisfies first threshold requirement and a veto and/or non-validation of the event if the aggregate score does not satisfy the first threshold requirement. In another example embodiment, the aggregate result may be an approval and/or validation of the event if the aggregate score satisfies a first threshold requirement, a tentative approval and/or validation if the aggregate score does not satisfy the first threshold requirement but does satisfy a second threshold requirement, and a veto and/or non-validation of the event if the aggregate score does not satisfy the second threshold requirement. In various embodiments, the first and/or second threshold requirements may be predetermined, predefined, or configurable based on an intended application and/or administrative preferences corresponding to the distributed ledger.

In an example embodiment, a first processing object 420A may provide an object result comprising a confidence level or approval rating and a second processing object may provide an object result comprising an approval. In such instances, the approval may be considered a 100% or high confidence level and/or a strongly positive approval rating. In an example embodiment, if one or more processing objects provide object results that comprise a veto, the aggregate result may be a veto and/or an indication that the domain specific engine 406 does not suggest and/or support validating the event and/or writing the event to the distributed ledger. In an example embodiment, if a processing object provides an object result that comprises a veto, the veto may be considered as a 0% or very low confidence level and/or a strongly negative approval rating when determining the aggregate result.

At 518, the processing manager 408 may provide, pass, and/or the like the aggregate result to the core consensus engine 404. For example, the processing manager 408 may provide the aggregate result to the core consensus engine 404 via the interface 424. The core consensus engine 404 may receive the aggregate result.

At 520, responsive to receiving the aggregate result, the core consensus engine 404 may generate a consensus response 412. For example, the consensus response 412 may be generated based on the aggregate result, the result of the core function(s), and/or the rules, protocols, and/or the like of the distributed ledger. In an example embodiment, the consensus response 412 indicates either that the second node computing entity 200B (e.g., via the execution of the core consensus engine 404 and/or the domain specific engine 406 by the processor) has satisfactorily validated the event corresponding to the consensus request 402 or that the second node computing entity 200B (e.g., via the execution of the core consensus engine 404 and/or the domain specific engine 406 by the processor) was not able to satisfactorily validate the event corresponding to the consensus request 402. In various embodiments, the second node computing entity 200B may not be able to satisfactorily validate an event corresponding to a consensus request 402 because the confidence level with which the event, event information/data and/or a portion thereof was validated does not satisfy a validation approval threshold of the distributed ledger, because at least a portion of the event information/data has been determined to be incorrect or false in whole and/or in part, because the user and/or first node computing entity 200A submitting the consensus request does not have appropriate permissions to submit an event and/or an event of the type corresponding to the event, because the event is improperly formatted, and/or the like. For example, if the aggregate result indicates that the event should not be validated for inclusion in the distributed ledger, the consensus response 412 may be negative or indicate that the second node computing entity 200B could not satisfactorily validate the event corresponding to the consensus request 402. In another example, if one or more of the core functions could not validate the event and/or the corresponding event information/data, the consensus response 412 may be negative or indicate that the second node computing entity 200B could not satisfactorily validate the event corresponding to the consensus request 402. In an example embodiment, if the aggregate result is positive and/or indicates that the event and/or event information/data has been satisfactorily validated (e.g., based on satisfying a validation approval threshold of the distributed ledger and/or the like) and the core functions were able to validate the event and/or event information/data, the consensus response 412 may be positive or indicate that the second node computing entity 200B has satisfactorily validated the event corresponding to the consensus request 402.

At 522, the core consensus engine 404 may cause the communications interface (e.g., network interface 220, 320, transmitter 304, and/or the like) to provide, transmit, and/or the like the consensus response 412. The first node computing entity 200A may receive consensus responses 412 from one or more second node computing entities 200B and, based on the rules, protocols, and/or the like of the distributed ledger, determine if the event is to be written to the distributed ledger based on the received consensus responses 412. If it is determined that the event is to be written to the distributed ledger, the first node computing entity 200A may then write the event to the distributed ledger. If it is determined that the event is not to be written to the distributed ledger, the first node computing entity 200A may provide an error message, notification, alert, and/or the like to the user and/or application from which the event originated.

Various embodiments provide a variety of technical improvements over traditional distributed ledger consensus processes. For example, various embodiments of the present invention eliminate, reduce, and/or minimize the use of smart contracts in performing consensus and/or validation processes. In particular, smart contracts executed by different node computing entities may be inconsistent and thereby cause the consensus processing performed by various node computing entities to lead to inconsistent results in the validation, confirmation, and/or the like of events. For example, various embodiments eliminate, reduce, and/or minimize the risk that multiple versions of smart contracts are used for performing validity and/or acceptance checks for a distributed ledger by eliminating, reducing, and/or minimizing the use of smart contracts in the consensus and/or validation processes. Therefore, example embodiments improve the quality and interoperability of the event information/data with the knowledge that all node computing entities have and/or have access to the same validity and acceptance logic (e.g., the computer program code corresponding to the domain specific engine and/or processing objects) for use as part of the consensus processing. Thus, various embodiments improve the data quality, dependability, and/or validity of a distributed ledger, such as, for example, in a blockchain data store. Additionally, various embodiments incorporate a flexible pluggable and/or extensible consensus process design that may be easily expanded and/or modified as desired by an administrative entity of the distributed ledger. Moreover, various embodiments of the present invention may be incorporated into lottery-based, voting-based, and/or a variety of other consensus processes and/or methods.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of performing a consensus process for a distributed ledger, the method comprising:
    receiving a consensus request by a core consensus engine executed by a processor of a node computing entity, wherein (a) the node computing entity comprises the processor, a memory storing computer program code, and a communications interface, (b) the node computing entity is one of a plurality of node computing entities storing the distributed ledger, (c) the computer program code comprises executable portions corresponding to the core consensus engine, (d) the consensus request corresponds to an event, (e) the event (i) corresponds to a domain and (ii) has a type, and (f) the consensus request comprises information corresponding to the event;
    providing at least a portion of the information corresponding to the event and the type to at least one processing manager executed by the processor of the node computing entity, wherein the at least one processing manager is a domain specific processing manager specific to the domain;
    identifying a set of one or more processing objects by the processing manager based on the type, wherein a processing object of the one or more processing objects is a computer executable module to be executed by the node computing entity;
    calling, by the processing manager, at least one processing object of the set of one or more processing objects via a corresponding interface and providing at least a portion of the information corresponding to the event to the at least one processing object;
    executing the at least one processing object by the processor of the node computing entity to generate a corresponding at least one object result;
    aggregating the at least one object result by the processing manager to generate an aggregate result;
    determining, by the core consensus engine, a consensus response based at least in part on the aggregate result; and
    causing the communications interface of the node computing entity to provide the consensus response, via execution of an executable portion corresponding to the core consensus engine by the processor, to at least one of the plurality of node computing entities.

2. The method of claim 1, wherein the at least one object result comprises at least one of (a) a veto, (b) a confidence level, (c) an approval rating, or (d) an approval.

3. The method of claim 1, wherein the distributed ledger is a blockchain data store.

4. The method of claim 1, further comprising executing the core consensus engine by the processor to perform one or more core functions, wherein the consensus response is determined in part based on results of the one or more core functions.

5. The method of claim 4, wherein performing the one or more core functions comprises executing at least a portion of one or more smart contracts.

6. The method of claim 1, wherein the one or more processing objects are executed in a serial manner.

7. The method of claim 1, wherein the one or more processing objects are executed in a parallel manner.

8. The method of claim 1, wherein the one or more processing objects are each independent of the other one or more processing objects.

9. The method of claim 1, wherein the one or more processing objects are pluggable modules.

10. An apparatus comprising at least one processor, at least one communications interface, and at least one memory including computer program code, the computer program code comprising executable portions corresponding to a core consensus engine, the apparatus being a node of a plurality of nodes storing a distributed ledger, the at least one memory and computer program code configured to, with the processor, cause the apparatus to at least:
    receive a consensus request by the core consensus engine executed by the processor, wherein (a) the consensus request corresponds to an event, (b) the event (i) corresponds to a domain and (ii) has a type, and (c) the consensus request comprises information corresponding to the event;
    provide at least a portion of the information corresponding to the event and the type to at least one processing manager executed by the processor, wherein the at least one processing manager is a domain specific processing manager specific to the domain;
    identify a set of one or more processing objects by the processing manager based on the type, wherein a processing object of the one or more processing objects is a computer executable module to be executed by the node computing entity;
    call, by the processing manager, at least one processing object of the set of one or more processing objects via a corresponding interface and provide at least a portion of the information corresponding to the event to the at least one processing object;
    execute the at least one processing object by the processor to generate a corresponding at least one object result;
    aggregate the at least one object result by the processing manager to generate an aggregate result;

determine, by the core consensus engine, a consensus response based at least in part on the aggregate result; and cause the communications interface to provide the consensus response, via execution of an executable portion corresponding to the core consensus engine by the processor, to at least one of the plurality of nodes.

11. The apparatus of claim 10, wherein the at least one object result comprises at least one of (a) a veto, (b) a confidence level, (c) an approval rating, or (d) an approval.

12. The apparatus of claim 10, wherein the distributed ledger is a blockchain data store.

13. The apparatus of claim 10, wherein the at least one memory and computer program code are further configured to, with the processor, cause the apparatus to at least execute an executable portion corresponding to the core consensus engine by the processor to perform one or more core functions, wherein the consensus response is determined in part based on results of the one or more core functions.

14. The apparatus of claim 13, wherein performing the one or more core functions comprises executing at least a portion of one or more smart contracts.

15. The apparatus of claim 10, wherein the one or more processing objects are executed in a serial manner.

16. The apparatus of claim 10, wherein the one or more processing objects are executed in a parallel manner.

17. The apparatus of claim 10, wherein the one or more processing objects are each independent of the other one or more processing objects.

18. The apparatus of claim 10, wherein the one or more processing objects are pluggable modules.

19. A computer program product comprising at least one non-transitory computer-readable storage medium having computer-executable program code portions stored therein, the computer-executable program code portions comprising program code instructions corresponding (a) a core consensus engine and (b) a domain specific engine, the program code instructions corresponding to the domain specific engine comprising (i) program code instructions corresponding to at least one processing manager and (ii) one or more pluggable modules corresponding to one or more processing objects, the computer program code instructions, when executed by a processor of a node computing entity storing a distributed ledger, are configured to:

receive a consensus request by the core consensus engine, wherein (a) the consensus request corresponds to an event, (b) the event (i) corresponds to a domain and (ii) has a type, and (c) the consensus request comprises information corresponding to the event;

provide at least a portion of the information corresponding to the event and the type to the at least one processing manager, wherein the at least one processing manager is a domain specific processing manager specific to the domain;

identify a set of one or more processing objects by the processing manager based on the type, wherein a processing object of the one or more processing objects is a computer executable module to be executed by the node computing entity;

call, by the processing manager, at least one processing object of the set of one or more processing objects via a corresponding interface and provide at least a portion of the information corresponding to the event to the at least one processing object;

execute the at least one processing object to generate a corresponding at least one object result;

aggregate the at least one object result by the processing manager to generate an aggregate result;

determine, by the core consensus engine, a consensus response based at least in part on the aggregate result; and cause, by the core consensus engine, a communications interface of the node computing entity to provide the consensus response, to at least one of a plurality of node computing entities storing the distributed ledger.

20. The computer program product of claim 19, wherein the computer program code instructions, when executed by the processor of the node computing entity, are further configured to perform one or more core functions via the core consensus engine, wherein the consensus response is determined in part based on results of the one or more core functions.

* * * * *